Feb. 19, 1952  E. V. SCHAAL  2,586,096
WINDSHIELD CLEANER
Filed Dec. 22, 1945
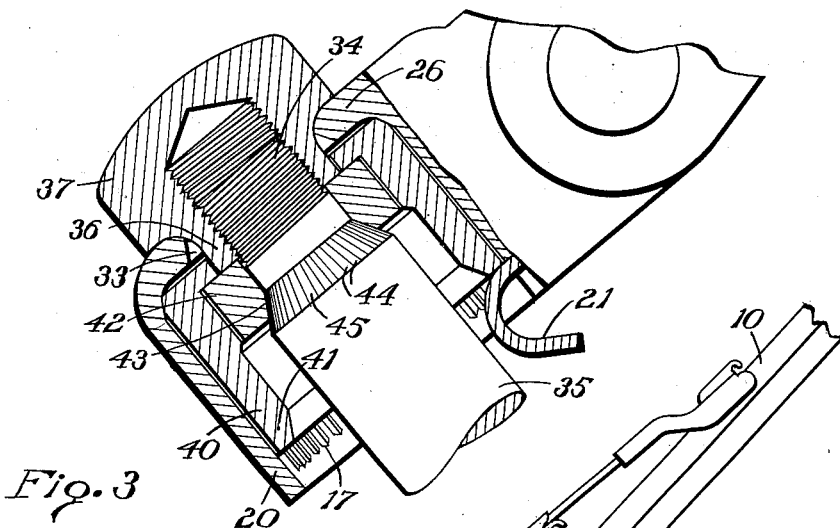
Fig. 3
Fig. 1
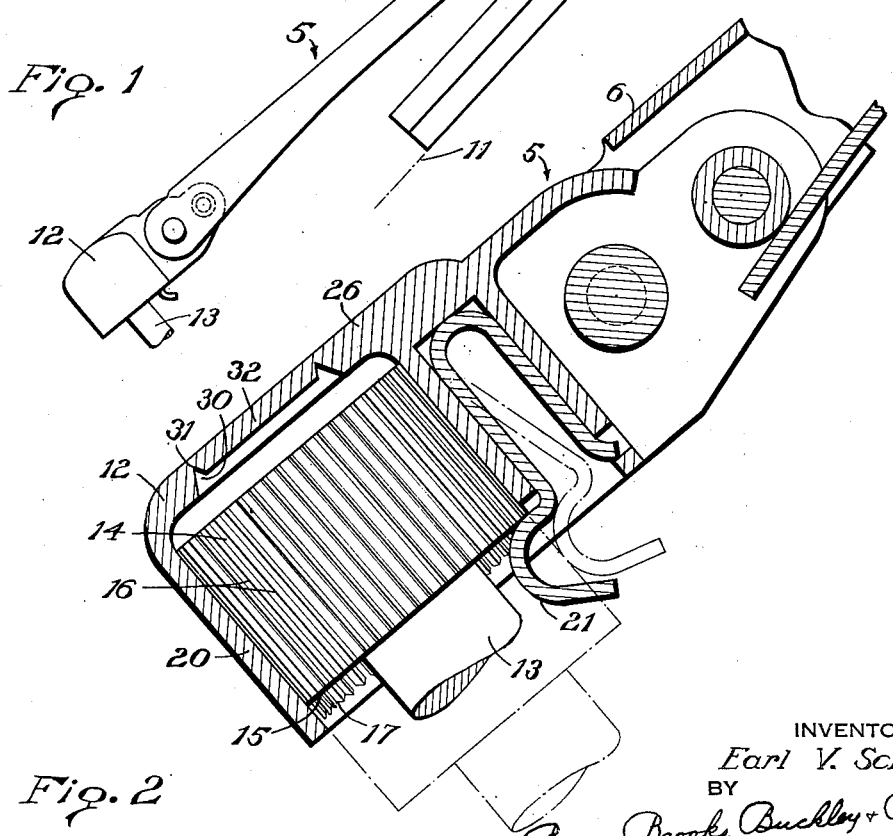
Fig. 2
INVENTOR
Earl V. Schaal
BY
Beau, Brooks, Buckley + Beau.
ATTORNEYS Patented Feb. 19, 1952

2,586,096

UNITED STATES PATENT OFFICE 2,586,096

WINDSHIELD CLEANER

Earl V. Schaal, East Aurora, N. Y., assignor to Trico Products Corporation, Buffalo, N. Y.

Application December 22, 1945, Serial No. 636,687

6 Claims. (Cl. 287—53)

The invention relates in general to windshield cleaners and in particular to a windshield wiper arm adapted to be used as a replacement item.

It is well known to those skilled in the art that most windshield wiper arm shafts are of two general types which include a large number of different windshield wipers used today. One of these types comprises a shaft having an enlarged knurled head over which the shaft-engaging section of the arm is placed, a retaining member engaging the inner edge of the head to hold the arm in place. The other type comprises a shaft which extends through and projects beyond an opening formed through the shaft-engaging portion of the wiper arm, upon which projecting end a nut is placed for securing the arm in position.

The principal object of the invention has been to provide a universal or interchangeable wiper arm of such design that it may be adapted for use on a number of different types of windshield wiper shafts, thus enabling a service man to replace defective arms without having to carry a large stock of different types on hand.

In order to accomplish the desired objects, the invention is designed primarily to fit one type of windshield wiper shaft, means being provided to readily adapt it to fit another type of shaft.

Specifically, the invention contemplates the use of a part which is removable when the arm is to be fitted to a different type of shaft.

Moreover, the invention contemplates the use of a knock-out disk which is not cut through the attached wall and, therefore, enables the preservation of the original neat external appearance when in use.

Furthermore, the knock-out part is completely united to the shaft-engaging portion of the wiper arm and is so formed that when broken away around the weakened area, a relatively smooth hole will be provided, any disfigurement resulting from the removal of the adapter part being covered by the accessory part used in adapting it to an extending shaft.

The above objects and advantages have been accomplished by the device shown in the accompanying drawings, of which:

Fig. 1 is a side elevation of the windshield wiper arm attached to one type of wiper shaft;

Fig. 2 is a greatly enlarged view of the form of invention shown in Fig. 1; and

Fig. 3 is a similar view of the invention as applied to a wiper shaft of a different type.

Referring to the drawings and particularly to the form shown in Figs. 1 and 2 thereof, 5 represents a windshield cleaner arm having an outer section 6 carrying, in well known manner, a wiper blade 10 which is shown in engagement with the surface 11 of a windshield. The wiper arm is also provided with a shaft-engaging section 12.

This form of the invention is adapted for use upon a shaft 13 having a head 14, the inner or under portion of which provides a shoulder 15. The head may be knurled by providing its periphery with a series of longitudinally extending teeth 16 which engage with coacting grooves 17 formed in the socket 20 of the arm section 12. When so engaged, as shown in Fig. 2, a resilient latch member 21 interlocks with the shoulder 15 to hold the wiper arm upon the shaft.

As shown in Fig. 2, the bottom wall 26 of the socket 20 is formed with an internal recess or groove 30, preferably V-shaped in cross section, thus providing a relatively thin area 31 extending around the resultant disk 32. The thickness of the disk 32 is preferably less than the thickness of the base 26, but is heavy enough to retain its shape and is thereby prevented from tearing when being separated from the base wall of the socket. When the wiper arm is to be used on a shaft of the type shown in Fig. 2, it is simply slipped over the knurled head 14 and retained in position by the engagement of the spring latch 21.

When, however, the arm is to be used with the type of wiper shaft shown in Fig. 3, a suitable punch or other tool is used to separate the disk 32 from the base 26, thereby providing a coaxially arranged hole 33 for the passage of the threaded end 34 of the shaft 35 and the sleeve 36 of the attaching nut 37. When so used, an adapter head or insert 40 is used. This head may be knurled in a manner similar to the shaft head 14 for engagement with the grooves 17 formed in the arm socket 20 and when die cast is provided with a thrust receiving collar 42 which is preferably of hardened material and may be molded in place within the insert. This collar is formed on its inner face 43 with grooves or serrations which engage the serrations 44 formed on the tapered shoulder 45 of the wiper shaft. Before mounting the arm upon the shaft 35, the adapter head 40 is placed within the socket 20 where it will be held by the resilient latch member 21 in a manner similar to the shaft head 14. The arm with the assembled insert is now placed over the shaft, the surface 43 of the collar being brought into engagement with the tapered shoulder 45 of the shaft, and thereafter the nut 37 is placed upon the threaded portion of the shaft and the whole assembly is secured by screwing it down to position. It will be noted that the collar 42 is engaged by the sleeve 36 of the nut 37, thereby taking all the clamping thrust and thereby relieving the head 40 and socket 20 of resulting strain. The clamping nut overhangs the perforated wall 26 of the arm so as to close the hole 33 and hold the socket 20 in position on the shaft.

The arm is given its original factory prescribed finish of chrome, or the like, for use on the headed shaft of Fig. 2 and yet may readily be adapted to the shouldered shaft for securement by its nut, and while the foregoing description has been detailed, it is without the thought of limiting the scope of the invention except as defined by the appended claims.

What is claimed is:

1. An arm for windshield cleaners, comprising a shaft-mounting section having a socket, an insert head for engagement with said socket, said insert head having a shell of cast metal non-rotatably engaging said socket, a hardened insert collar fixedly carried by said shell and engageable with a windshield wiper shaft, and a nut engaging said shaft for forcing said hardened collar against said shaft independently of said cast shell or said shaft-mounting section.

2. A windshield arm having a socket adapted for mounting upon a screw-threaded type shaft, an adapter head slidably mounted within said socket, a nut threaded on said shaft and acting to retain the head upon said shaft, and means detachably holding said head within said socket independently of said shaft and said nut.

3. A windshield arm adapted for interchangeable mounting upon different types of windshield wiper shafts, said arm having a shaft receiving socket in its rear face with an arcuate groove in the bottom wall of the socket defining a knockout disk which latter is removable to provide an opening through the bottom wall for adapting said socket to a protruding screw-threaded type of shaft, the front face of the arm originally being smooth and uninterrupted by the groove to present a finished appearance when mounted on a knurled-head type of shaft.

4. A wiper arm having a mounting section formed with a shaft-receiving recess in its inner face and an imperforate outer wall, a knock-out disk forming a part of such outer wall and delineated by an internal groove in the back surface of said wall thereby providing a weakened area around the disk, whereby the disk may be easily removed to adapt the arm to receiving a protruding type of wiper shaft.

5. A universal arm for a windshield cleaner having a shaft either with a knurled driving head or a nut receiving thread, comprising a mounting section having a socket with its side wall shaped to receive interlockingly a driving head, the base of the socket having a removable portion defined by a weakened margin for enabling removal of such portion to receive a threaded shaft, a replaceable driving head for the shaft interlockingly receivable within the socket, and means acting through the opening left by the removal of said portion to secure the replaceable driving head to the shaft.

6. A windshield arm adapted for a selective mounting upon either headed or threaded types of windshield wiper shafts, said arm having a shaft-receiving socket in its rear face for receiving a headed shaft and also having a front wall providing a finished appearance when so used, a knock-out disk forming a part of such front wall and being delineated therein by an arcuate recess formation concentric with the socket to provide a weakened area around the disk for enabling the latter being easily removed to adapt the arm to receive a protruding type of wiper shaft.

EARL V. SCHAAL.

REFERENCES CITED

The following references are of record in the file of this patent:

UNITED STATES PATENTS

| Number | Name | Date |
|---|---|---|
| 1,913,807 | Jones | June 13, 1933 |
| 2,315,350 | Rappl | Mar. 30, 1943 |
| 2,317,245 | Bell | Apr. 20, 1943 |